US010739288B2

(12) United States Patent
Kim et al.

(10) Patent No.: US 10,739,288 B2
(45) Date of Patent: Aug. 11, 2020

(54) APPARATUS AND METHOD FOR TESTING CONDUCTIVITY OF GRAPHENE

(71) Applicant: IUCF-HYU (INDUSTRY-UNIVERSITY COOPERATION FOUNDATION HANYANG UNIVERSITY), Seoul (KR)

(72) Inventors: Hak-Sung Kim, Seoul (KR); Sung-Hyeon Park, Gimhae-si (KR); Do-Hyoung Kim, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 0 days.

(21) Appl. No.: 16/165,313

(22) Filed: Oct. 19, 2018

(65) Prior Publication Data

US 2019/0107500 A1    Apr. 11, 2019

Related U.S. Application Data

(63) Continuation of application No. 15/120,459, filed as application No. PCT/KR2015/001532 on Feb. 16, 2015, now abandoned.

(30) Foreign Application Priority Data

Feb. 20, 2014   (KR) .................. 10-2014-0019650

(51) Int. Cl.
  *G01N 27/04*   (2006.01)
  *G01N 21/3581*   (2014.01)
  (Continued)

(52) U.S. Cl.
  CPC .............. *G01N 27/04* (2013.01); *G01J 3/42* (2013.01); *G01J 5/0896* (2013.01);
  (Continued)

(58) Field of Classification Search
  CPC .............. G01N 27/04; G01N 21/3581; G01N 2201/069; G01J 5/0896; G01J 2005/0077
  See application file for complete search history.

(56) References Cited

U.S. PATENT DOCUMENTS 7,947,955 B2   5/2011   Kawano et al.
8,836,446 B2   9/2014   Sensale-Rodriguez
(Continued)

FOREIGN PATENT DOCUMENTS

CN         103364374 A    10/2013
KR    10-2013-0099600 A    9/2013
(Continued)

OTHER PUBLICATIONS

International Search Report dated May 22, 2015 in PCT/KR2015/001532, filed Feb. 16, 2015.
(Continued)

*Primary Examiner* — Akm Zakaria
(74) *Attorney, Agent, or Firm* — Oblon, McClelland, Maier & Neustadt, L.L.P.

(57) ABSTRACT

According to the present invention, oxidized and reduced regions of graphene can be accurately detected in a short time using a terahertz wave so as to measure the conductivity of graphene, and thus the time required to test the conductivity of graphene can be reduced. In addition, when an oxidized region exists in graphene, the oxidized region can be immediately reduced by irradiating an electromagnetic wave thereto so as to increase the conductivity of graphene and thus minimize the time required to restore graphene.

18 Claims, 5 Drawing Sheets

(51) Int. Cl.
*G01J 3/42* (2006.01)
*G01J 5/08* (2006.01)
*G01J 5/00* (2006.01)

(52) U.S. Cl.
CPC .. *G01N 21/3581* (2013.01); *G01J 2005/0077* (2013.01); *G01N 2201/069* (2013.01)

(56) References Cited

U.S. PATENT DOCUMENTS

| | | | |
|---|---|---|---|
| 2010/0200755 A1* | 8/2010 | Kawano | H01L 31/09 250/338.4 |
| 2011/0292373 A1 | 12/2011 | Witting et al. | |
| 2011/0299066 A1* | 12/2011 | Kusukame | G01N 21/19 356/51 |
| 2013/0265567 A1 | 10/2013 | Won et al. | |
| 2013/0342279 A1 | 12/2013 | Sensale-Rodriguez et al. | |
| 2014/0183441 A1* | 7/2014 | Park | H01L 31/028 257/9 |

FOREIGN PATENT DOCUMENTS

| | | |
|---|---|---|
| KR | 10-2013-0114617 A | 10/2013 |
| KR | 20130114617 A * | 10/2013 |

OTHER PUBLICATIONS

Office Action dated May 2, 2018 in corresponding Chinese Patent Application No. 201580009904.3, 10 pages.
Office Action dated May 22, 2016 in corresponding Korean Patent Application No. 10-2014-0019650, 6 pages.
Lijuan Xie et al., "Advancement and Trend of Terahertz Spectroscopy Technique for Non-destructive Detection", Journal of Agricultural Machinery, vol. 44, issue 7, Jul. 31, 2013, pp. 246-255.

* cited by examiner

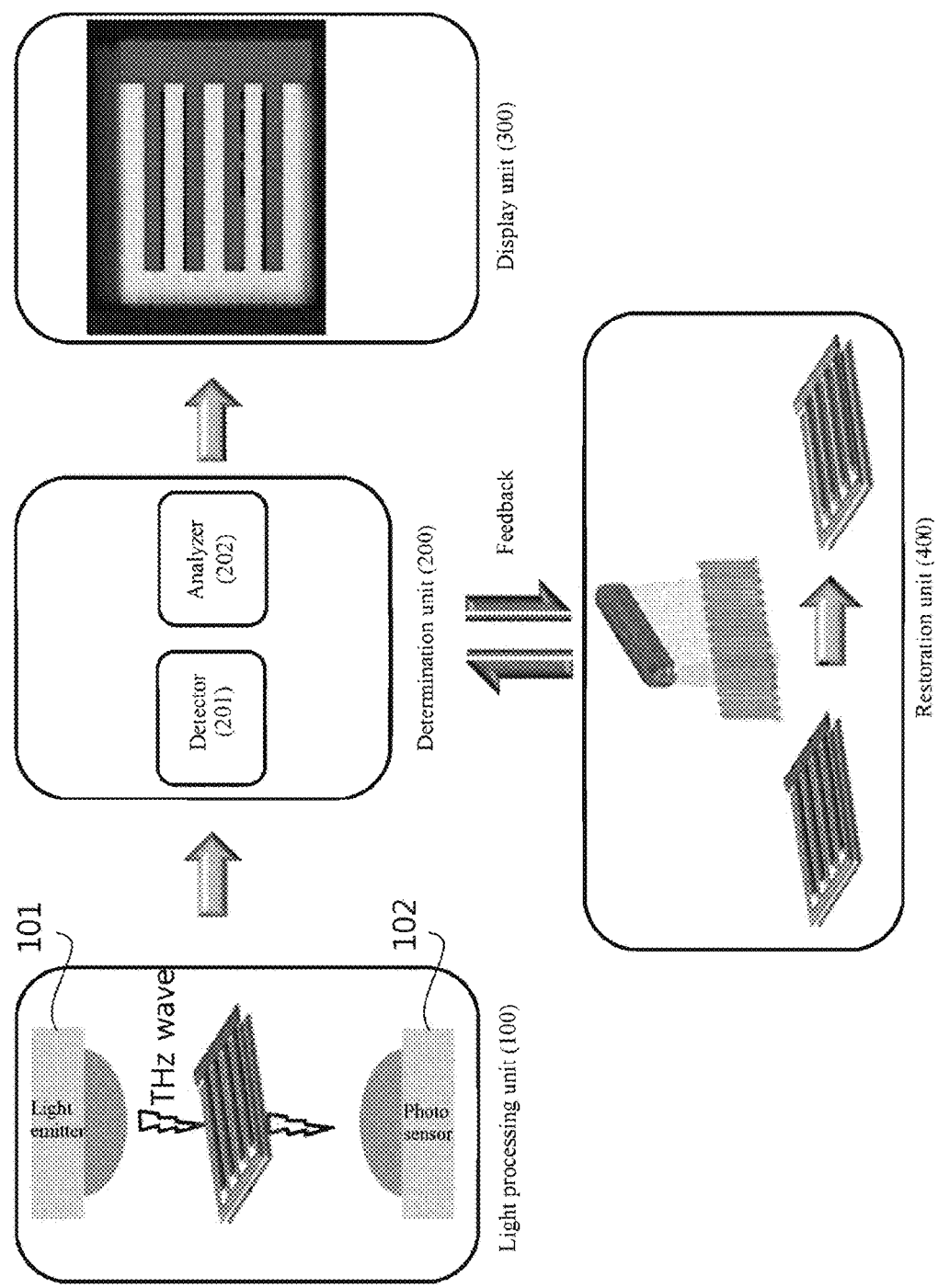
[FIG. 1]

[Fig. 2]
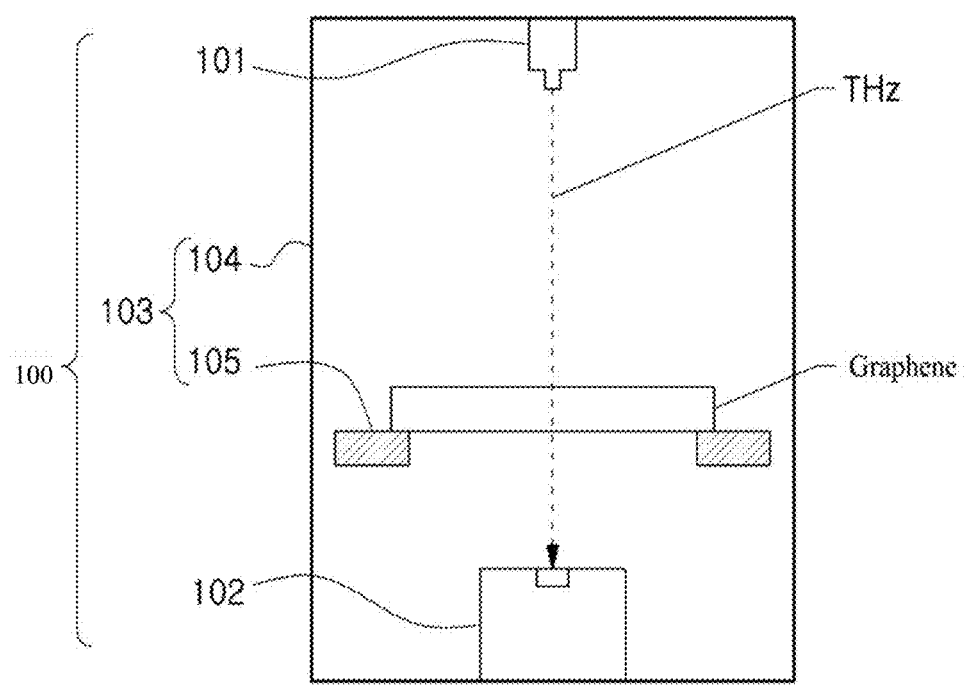

[Fig. 3]
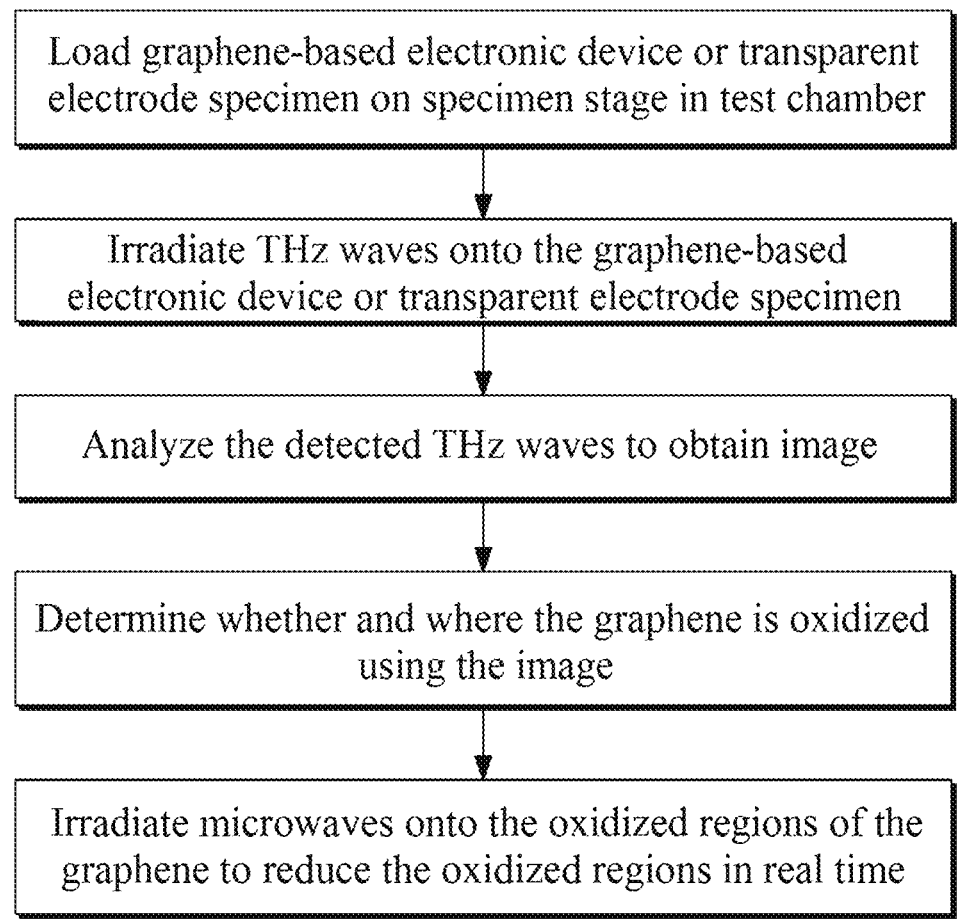

[Fig. 4]
Reduction of graphene
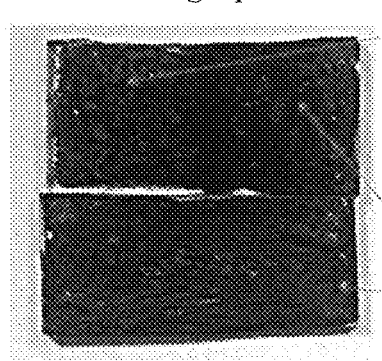
(a) Graphene
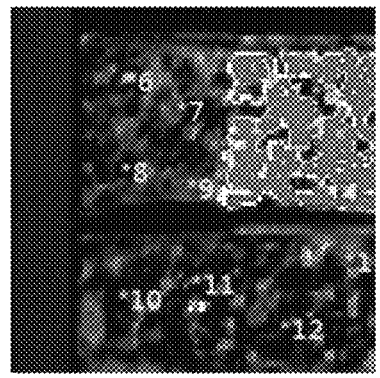
(b) Image of graphene after testing
[Fig. 5]
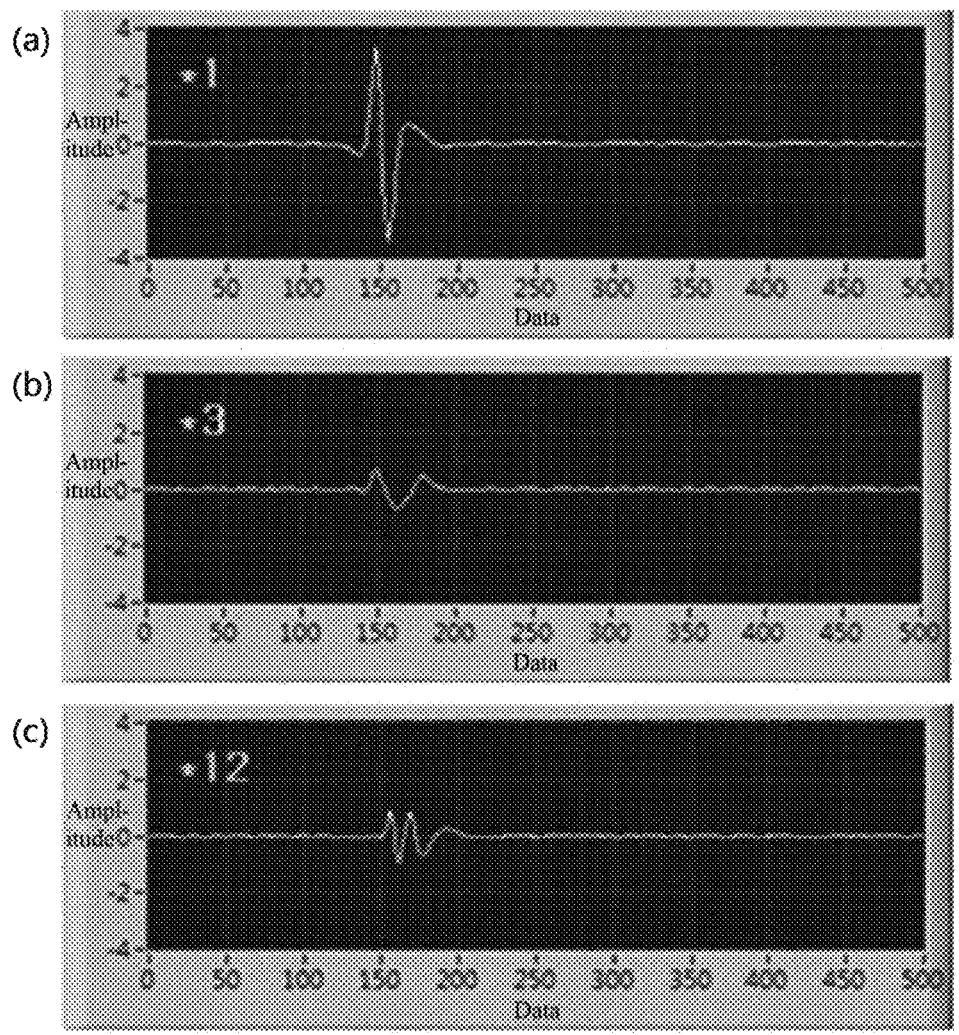

[Fig. 6]
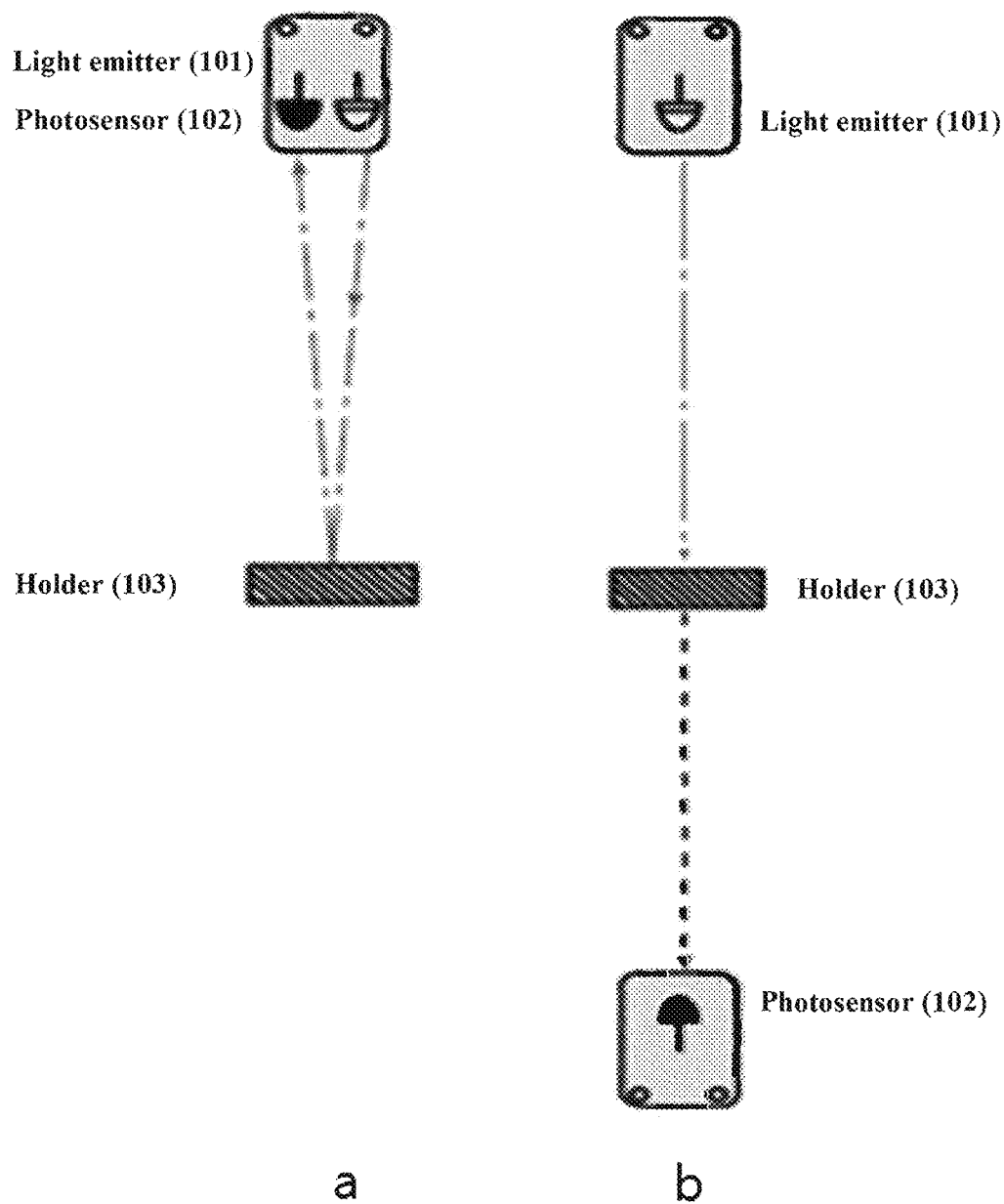

APPARATUS AND METHOD FOR TESTING CONDUCTIVITY OF GRAPHENE

CROSS REFERENCE TO RELATED APPLICATIONS

The present application is a continuation of U.S. patent application Ser. No. 15/120,459, filed on Mar. 13, 2017, which is a 35 U.S.C. § 371 national stage patent application of international patent application PCT/KR2015/001532, filed on Feb. 16, 2015, which claims priority to Korean patent application 10-2014-0019650, filed on Feb. 20, 2014.

TECHNICAL FIELD

The present invention relates to an apparatus and method for testing the conductivity of graphene, and more specifically to an apparatus and method for testing the conductivity of graphene through the detection of oxidized or reduced regions of the graphene.

BACKGROUND ART

Graphene is a 2-dimensional structure of carbon atoms arranged in a hexagonal crystal lattice. Graphene has high electrical conductivity, high thermal conductivity, and high mechanical stiffness despite its small thickness (~3.4 Å). Due to such characteristics, graphene has been in the spotlight as a material for semiconductor devices that has the potential to replace silicon in the near future. The high electrical conductivity and high mechanical stiffness of graphene make it easier to produce flexible substrates. Based on these physical properties, graphene has attracted attention as a transparent electrode material capable of replacing indium tin oxide (ITO).

Graphene oxide is stable due to its high solubility. Accordingly, graphene is stored and transported in its oxide form and graphene oxide is reduced for use where conductive graphene is required. However, graphene oxide is not completely reduced. In some cases, reduced graphene oxide is again oxidized. Test methods for graphene are thus considered important.

According to conventional methods for testing mass-produced large-area graphene, the presence or absence of defects in graphene is determined by observing a change in temperature distribution after a current is applied to the graphene. Large-area graphene loses its conductivity when partially oxidized. In this case, the application of current causes a difference in electrical resistance between oxidized and reduced regions of the graphene. The different resistance values lead to a difference in the amount of heat generation upon the application of current, and as a result, the thermal distribution of defective regions (oxidized regions) is distinguished from that of defect-free regions (reduced regions). By inspecting the different thermal distributions using a thermal imaging camera, a determination can be made as to whether the graphene is defective or not.

However, when the defective regions are monitored through their thermal distributions, it is impossible to determine the exact position and size of the defective regions. No report has appeared on more precise apparatuses and methods for testing mass-produced graphene to determine the position and size of defective regions in the graphene.

In this connection, Korean Patent Publication 10-2013-0114617 discloses a method for testing graphene substrates using ultraviolet light. However, this method requires a darkroom to use ultraviolet light, causing inconvenience for users, and utilizes the ultraviolet light transmittance of graphene through a difference in the formation of graphene layers rather than the electrical conductivity of graphene itself, limiting its accuracy.

DETAILED DESCRIPTION OF THE INVENTION

Problems to be Solved by the Invention

Therefore, an object of the present invention is to provide an apparatus and method for testing the conductivity of graphene in which terahertz waves are used to measure the conductivity of graphene.

Means for Solving the Problems

One aspect of the present invention provides an apparatus for testing the conductivity of graphene, including a light processing unit for irradiating terahertz waves onto graphene and receiving the terahertz waves reflected from or transmitted through the graphene, a determination unit for detecting the terahertz waves from the light processing unit to detect oxidized and reduced regions of the graphene, and a display unit for imaging data processed in the determination unit.

The terahertz waves irradiated from the light processing unit may be transmitted vertically through the graphene.

A light source for the terahertz waves may be of pulsed or continuous type and may be provided in plurality, and the terahertz waves may have wavelengths of 30 μm to 3 mm.

The light processing unit includes a holder adapted to fix the graphene, a light emitter placed above the graphene holder and including a light source adapted to irradiate terahertz waves, and a photosensor placed below the graphene holder to receive the terahertz waves transmitted through the graphene.

The apparatus of the present invention may further include a restoration unit for irradiating electromagnetic waves onto the oxidized regions of the graphene detected in the determination unit to reduce the oxidized regions.

The electromagnetic waves may include all wavelengths in the ultraviolet, visible, and infrared regions. Specifically, the electromagnetic waves may have wavelengths of 160 nm to 2.5 μm.

Another aspect of the present invention provides a method for testing the conductivity of graphene, including (a) fixing graphene to a specimen stage, (b) irradiating terahertz waves onto the graphene, (c) detecting the transmittance of the graphene for the terahertz waves, (d) analyzing the transmittance for the detected terahertz waves to obtain an image, and (e) detecting oxidized regions of the graphene through the image.

A light source for the terahertz waves may be of pulsed or continuous type and may be provided in plurality.

The terahertz waves may have wavelengths of 30 μm to 3 mm.

The apparatus of the present invention may further include irradiating electromagnetic waves onto the oxidized regions of the graphene detected in step (e) to reduce the oxidized regions.

The electromagnetic waves may include all wavelengths in the ultraviolet, visible, and infrared regions. Specifically, the electromagnetic waves may have wavelengths of 160 nm to 2.5 μm.

The test target graphene may be an electrode device or a transparent electrode.

Effects of the Invention

According to the present invention, terahertz waves are irradiated onto large-area graphene to detect the transmittance of the graphene. This allows for rapid measurement of oxidized and reduced regions of the graphene, enabling the detection of the electrical conductivity of the graphene. In addition, the oxidized regions of the graphene are reduced immediately after detection. This can shorten the time required to restore the oxidized regions of the graphene, leading to a reduction in the overall testing time and cost.

BRIEF DESCRIPTION OF THE DRAWINGS

FIG. 1 illustrates the constitution of an apparatus for testing the conductivity of graphene according to one embodiment of the present invention.

FIG. 2 is a block diagram illustrating the configuration of a light processing unit of the apparatus illustrated in FIG. 1.

FIG. 3 is a flowchart illustrating the steps of a method for testing the conductivity of graphene according to one embodiment of the present invention.

FIG. 4 shows (a) an image of graphene as a detection target and (b) an image of the graphene after testing in accordance with a method of the present invention.

FIG. 5 graphically shows reflectance values from some regions of the graphene shown in (b) of FIG. 4.

FIG. 6 is a partial block diagram illustrating the configuration of the light processing unit illustrated in FIG. 1.

BEST MODE FOR CARRYING OUT THE INVENTION

Hereinafter, the present invention will be described in more detail with reference to the accompanying drawings. It will be obvious to those skilled in the art that these drawings are provided for illustrative purposes only and the scope of the invention is not limited thereto.

FIG. 1 illustrates the constitution of an apparatus for testing the conductivity of graphene according to one embodiment of the present invention. The apparatus of the present invention includes a light processing unit 100, a determination unit 200, and a display unit 300. The apparatus of the present invention is characterized by the use of terahertz waves for measuring the conductivity of graphene.

The light processing unit 100 irradiates terahertz waves onto graphene, receives the terahertz waves reflected from or transmitted through the graphene, converts the received terahertz waves into electrical signals, and outputs the electrical signals.

The terahertz waves irradiated onto graphene are electromagnetic waves having wavelengths of 30 μm to 3 mm in the frequency range of 0.1 to 10 THz. Terahertz waves have a strong ability to pass through graphene because they are longer in wavelength than visible light and infrared light. Terahertz waves are available even where external light is present, unlike other light waves. Therefore, the use of terahertz waves can eliminate the need for the step of blocking external light.

A light source for the terahertz waves may be of pulsed or continuous type. A pulsed light source is more preferred due to its high transmission through graphene.

The light source for the terahertz waves is included in a light emitter 101. The light source for the terahertz waves may be provided in plurality. The use of the plural light sources for the terahertz waves enables 2-dimensional testing of graphene, leading to a significant reduction in the time required to test the graphene.

FIG. 2 is a block diagram illustrating the configuration of the light processing unit. As illustrated in FIG. 2, the light processing unit 100 includes a photosensor 102 and a holder 103 in addition to the light emitter 101.

The light emitter 101 is placed above the holder 103. After graphene is fixed to the holder 103, the light emitter 101 irradiates terahertz waves onto the fixed graphene. The terahertz waves irradiated from the light emitter 101 are transmitted through reduced regions of the graphene but are absorbed by or reflected from oxidized regions of the graphene.

Some of the terahertz waves irradiated from the light emitter 101 and incident on the graphene are reflected from the graphene and the other terahertz waves are transmitted through the graphene. The photosensor 102 receives the reflected or transmitted terahertz waves, converts the reflected or transmitted terahertz waves into electrical signals, and transmits the electrical signals to the determination unit 200. FIG. 6 is a partial block diagram illustrating the configuration of the light processing unit. As illustrated in FIG. 6, the photosensor 102 is placed above the holder 103 to detect the terahertz waves reflected from the graphene (a of FIG. 6). Alternatively, the photosensor 102 is placed below the holder 103 to detect the terahertz waves transmitted through the graphene (b of FIG. 6).

The holder 103 may include a chamber 104 and a specimen stage 105. The chamber 104 may be constructed such that the influence of external environmental factors is minimized to increase the test accuracy. The specimen stage 105 may be positioned in the chamber 104. The chamber 104 may include an inlet and an outlet through which the specimen stage 105 can enter and exit, respectively. However, the construction of the chamber 104 is not limited. The chamber 104 is a part of the holder 103 but may include the light emitter 101 and the photosensor 102. The specimen stage 105 may be positioned in the chamber 104 to fix the graphene. The specimen stage 105 is arranged between and in a straight line with the light emitter 101 and the photosensor 102. With this arrangement, the terahertz waves irradiated from the light emitter 101 are vertically incident on the graphene and the terahertz waves transmitted through graphene can be vertically received by the photosensor 102.

The specimen stage 105 may be constructed in a roll-to-roll or conveyor manner such that graphene is easily transferred.

The determination unit 200 receives the output signals from the light processing unit 100 and analyzes the reflectance or transmittance of the graphene for the terahertz waves to detect oxidized or reduced regions of the graphene. Graphene may be partially oxidized during production, storage or transport. Graphene oxide is unsuitable for use in transparent electrodes, etc. due to its low conductivity and is thus generally regarded as being defective. Since the irradiated terahertz waves are transmitted through the reduced regions but are absorbed by or reflected from the oxidized regions, the degree of reflection or transmission of the terahertz waves from or through the graphene varies depending on the reduced and oxidized regions of the graphene. The reflection or transmission of the terahertz waves allows for detection of the oxidized or reduced regions of the graphene, enabling the measurement of the graphene conductivity.

The determination unit 200 may include a detector 201 adapted to detect the transmittance of the graphene for the terahertz waves and an analyzer 202 adapted to analyze the detected transmittance. The determination unit 200 may include a storage (not shown) adapted to store data processed in the analyzer 202.

The display unit 300 displays the data analyzed in the determination unit 200 on a screen. The distribution of the oxidized regions of the graphene can be detected through the display unit 300. As illustrated in FIG. 1, the oxidized and reduced regions of the graphene are represented in red and green in the display unit 300, respectively, so that the distributions of the oxidized and reduced regions of the graphene can be identified without the need for further processing.

(b) of FIG. 4 is an image of the graphene obtained after irradiation of the graphene with terahertz waves. The reduced and oxidized regions of the graphene are represented in red and black or blue, respectively, so that a determination can be made as to whether and where the graphene is oxidized or reduced.

FIG. 5 graphically shows the terahertz waves reflected from positions 1, 3, and 12 as a function of time. Most of the terahertz waves irradiated onto the reduced regions of the graphene are transmitted through the graphene, which can be explained by the high conductivity of the reduced regions. Meanwhile, most of the terahertz waves irradiated onto the oxidized regions of the graphene are absorbed by or reflected from the graphene surface in the regions, which can be explained by the low conductivity of the oxidized regions. The terahertz waves reflected from position 1 shown in (b) of FIG. 4 are analyzed and the results are shown in (a) of FIG. 5. The high intensity of the peak indicates the reflection of the terahertz waves from the graphene, demonstrating that position 1 is the oxidized region of the graphene. The terahertz waves reflected from position 3 shown in (b) of FIG. 4 are analyzed and the results are shown in (b) of FIG. 5. The low intensities of the peaks indicate that the region of position 3 is different from that of position 1. That is, position 3 is a pore between the reduced regions of the graphene. (b) of FIG. 5 shows the reflection of the terahertz waves from a slide glass as a substrate where the graphene is fixed. Several peaks with low intensities appear in (c) of FIG. 5. One of the peaks corresponds to the reflection of the terahertz waves from the slide glass and the other peaks correspond to the reflection of some of the terahertz waves transmitted through the graphene. The transmission of the terahertz waves indicates high conductivity of the graphene. That is, position 12 is the reduced region of the graphene. In conclusion, the reduced and oxidized regions of the graphene can be detected from the results in FIG. 5.

The apparatus of the present invention may further include a restoration unit 400. Whenever the determination unit 200 detects oxidized regions of the graphene, the restoration unit 400 irradiates electromagnetic waves onto the oxidized regions of the graphene in real time to reduce the oxidized regions. That is, the restoration unit 400 serves to restore the oxidized regions of the graphene. This real-time reduction can shorten the time it takes to restore oxidized regions of graphene when compared to the reduction of detected oxidized regions of graphene in a separate process after testing of the conductivity of the graphene.

The electromagnetic waves include all wavelengths in the ultraviolet, visible, and infrared regions. Specifically, the electromagnetic waves are waves of white light having wavelengths of 160 nm to 2.5 μm that may be irradiated by suitable lamps, such as xenon flash lamps and UV lamps. The electromagnetic waves may have a pulse width of 0.1 to 100 ms, a pulse gap of 0.1 to 100 ms, and a pulse number of 1 to 1,000.

The present invention also provides a method for testing the conductivity of graphene, including (a) fixing graphene to a specimen stage, (b) irradiating terahertz waves onto the graphene, (c) detecting the transmittance of the graphene for the terahertz waves, (d) analyzing the transmittance for the detected terahertz waves to obtain an image, and (e) detecting oxidized regions of the graphene through the image.

FIG. 3 is a flowchart illustrating the steps of a method for testing the conductivity of graphene according to one embodiment of the present invention. As illustrated in FIG. 3, in step (a), graphene as a test target is fixed to (or loaded on) a specimen stage. The specimen stage may be positioned in a chamber.

In step (b), terahertz waves are irradiated onto the fixed graphene. The terahertz waves are vertically irradiated onto the graphene. The terahertz waves may have wavelengths of 30 μm to 3 mm. The terahertz waves are highly rectilinear and are thus available even where external light is present.

In step (c), the reflectance of the terahertz waves from the graphene or the transmittance of the graphene for the terahertz waves is detected. The detection of the terahertz waves reflected from or transmitted through the graphene in oxidized regions of the graphene is different from that in reduced regions of the graphene. For example, graphene oxide has a low transmittance for the terahertz waves because the terahertz waves are not transmitted through graphene oxide but are absorbed by or reflected from graphene oxide.

In step (d), the detected reflectance or transmittance is analyzed and imaged. Imaging is performed by plotting the analyzed reflectance or transmittance to obtain a curve. Alternatively, oxidized and reduced regions of the graphene may be projected onto the graphene to obtain a color image. As illustrated in FIG. 1, the oxidized and reduced regions of the graphene are represented in red and green in the display unit 300, respectively, so that they can be visually detected through the image without the need for additional processing.

In step (e), the image obtained in step (d) is used to determine whether and where the graphene is oxidized. The portions with low transmittance in the image correspond to oxidized regions of the graphene and are expected to have low conductivity because graphene oxide has low electrical conductivity and low transmittance for terahertz waves. The data analyzed in step (d) can be compared with the existing data to detect the oxidized and reduced regions of the graphene. The existing data mean, for example, the reflectance of terahertz waves from graphene whose conductivity is already known or the transmittance of graphene for terahertz waves. Regions where the detected transmittance of the graphene for the terahertz waves is lower than the existing data can be determined as oxidized regions of the graphene.

The method of the present invention may further include irradiating electromagnetic waves onto the detected oxidized regions of the graphene to reduce the oxidized regions. In this additional step, the oxidized regions of the graphene are restored. No additional material and no additional processing, such as annealing, are required, contributing to a reduction in restoration time and testing cost. The electromagnetic waves include all wavelengths in the ultraviolet, visible, and infrared regions. Specifically, the electromagnetic waves are waves of white light having wavelengths of 160 nm to 2.5 μm that may be irradiated by suitable lamps, such as xenon flash lamps and UV lamps. The electromagnetic waves may have a pulse width of 0.1 to 100 ms, a pulse gap of 0.1 to 100 ms, and a pulse number of 1 to 1,000.

<Explanation of Reference Numerals>

| | | |
|---|---|---|
| 100 Light processing unit | 101 Light emitter | 102 Photosensor |
| 103 Holder | 104 Chamber | 105 Specimen stage |
| 200 Determination unit | 201 Detector | 202 Analyzer |
| 300 Display unit | | |
| 400 Restoration unit | | |

The invention claimed is:

1. An apparatus, comprising:
    a light processing unit for irradiating terahertz waves onto graphene and receiving the terahertz waves reflected from or transmitted through the graphene;
    a determination unit for identifying oxidized and reduced regions of the graphene based on reflectance or transmittance of the terahertz waves from the graphene; and
    a display unit for imaging data processed in the determination unit,
    wherein the determination unit detects the terahertz waves from the light processing unit to detect the oxidized and reduced regions of the graphene.

2. The apparatus according to claim 1, wherein the terahertz waves are irradiated from a pulsed or continuous light source.

3. The apparatus according to claim 2, wherein the pulsed or continuous light source is provided in plurality.

4. The apparatus according to claim 2, wherein the terahertz waves have wavelengths of 30 μm to 3 mm.

5. The apparatus according to claim 1, wherein the light processing unit comprises:
    a graphene holder adapted to fix the graphene,
    a light emitter placed above the graphene holder and comprising a light source adapted to irradiate the terahertz waves, and
    a photosensor adapted to receive the terahertz waves reflected from or transmitted through the graphene.

6. The apparatus according to claim 1, further comprising:
    a restoration unit for irradiating electromagnetic waves onto the oxidized regions of the graphene detected in the determination unit to reduce the oxidized regions.

7. The apparatus according to claim 6, wherein the electromagnetic waves are pulsed or continuous and have wavelengths of 160 nm to 2.5 μm.

8. The apparatus according to claim 6, wherein the electromagnetic waves are pulsed and have a pulse width of 0.1 to 10 ms, a pulse gap of 0.1 to 100 ms, and a pulse number of 1 to 1,000.

9. A method for testing conductivity of graphene, the method comprising:
    (a) fixing the graphene to a specimen stage;
    (b) irradiating terahertz waves onto the graphene;
    (c) detecting terahertz waves reflected from or transmitted through the graphene;
    (d) analyzing the detected terahertz waves to distinguish oxidized regions and reduced regions of the graphene based on reflectance or transmittance of the terahertz waves from the graphene to obtain an image; and
    (e) identifying the oxidized regions of the graphene on the image.

10. The method according to claim 9, wherein the terahertz waves are irradiated from a pulsed or continuous light source.

11. The method according to claim 9, wherein the terahertz waves are irradiated from one or more light sources.

12. The method according to claim 9, wherein the terahertz waves have wavelengths of 30 μm to 3 mm.

13. The method according to claim 9, further comprising:
    irradiating electromagnetic waves onto the oxidized regions of the graphene detected in (e) to reduce the oxidized regions.

14. The method according to claim 13, wherein the electromagnetic waves are pulsed or continuous and have wavelengths of 160 nm to 2.5 μm.

15. The method according to claim 13, wherein the electromagnetic waves are pulsed and have a pulse width of 0.1 to 10 ms, a pulse gap of 0.1 to 100 ms, and a pulse number of 1 to 1,000.

16. The method according to claim 9, wherein the graphene is an electrode device or a transparent electrode.

17. The apparatus according to claim 1, wherein the display unit graphically displays distributions of the oxidized and reduced regions of the graphene.

18. The apparatus according to claim 1, wherein the oxidized and reduced regions indicate low and high conductivity regions, respectively.

* * * * *